June 15, 1926.
1,588,400
J. B. DREW
COMBINATION MIDDLEBREAKER AND CULTIVATOR ATTACHMENT FOR
PLANTERS OR FERTILIZER DISTRIBUTORS
Filed March 10, 1925    2 Sheets-Sheet 1
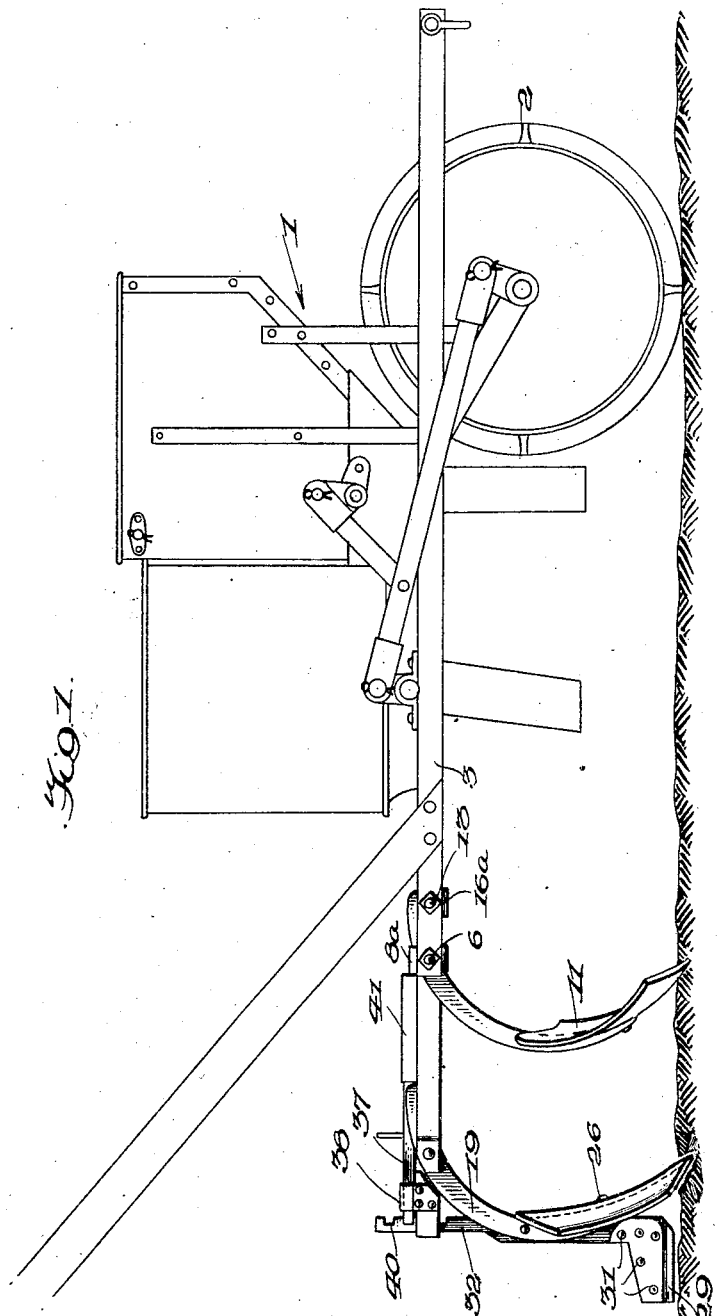

June 15, 1926. 1,588,400
J. B. DREW
COMBINATION MIDDLEBREAKER AND CULTIVATOR ATTACHMENT FOR
PLANTERS OR FERTILIZER DISTRIBUTORS
Filed March 10, 1925 2 Sheets-Sheet 2
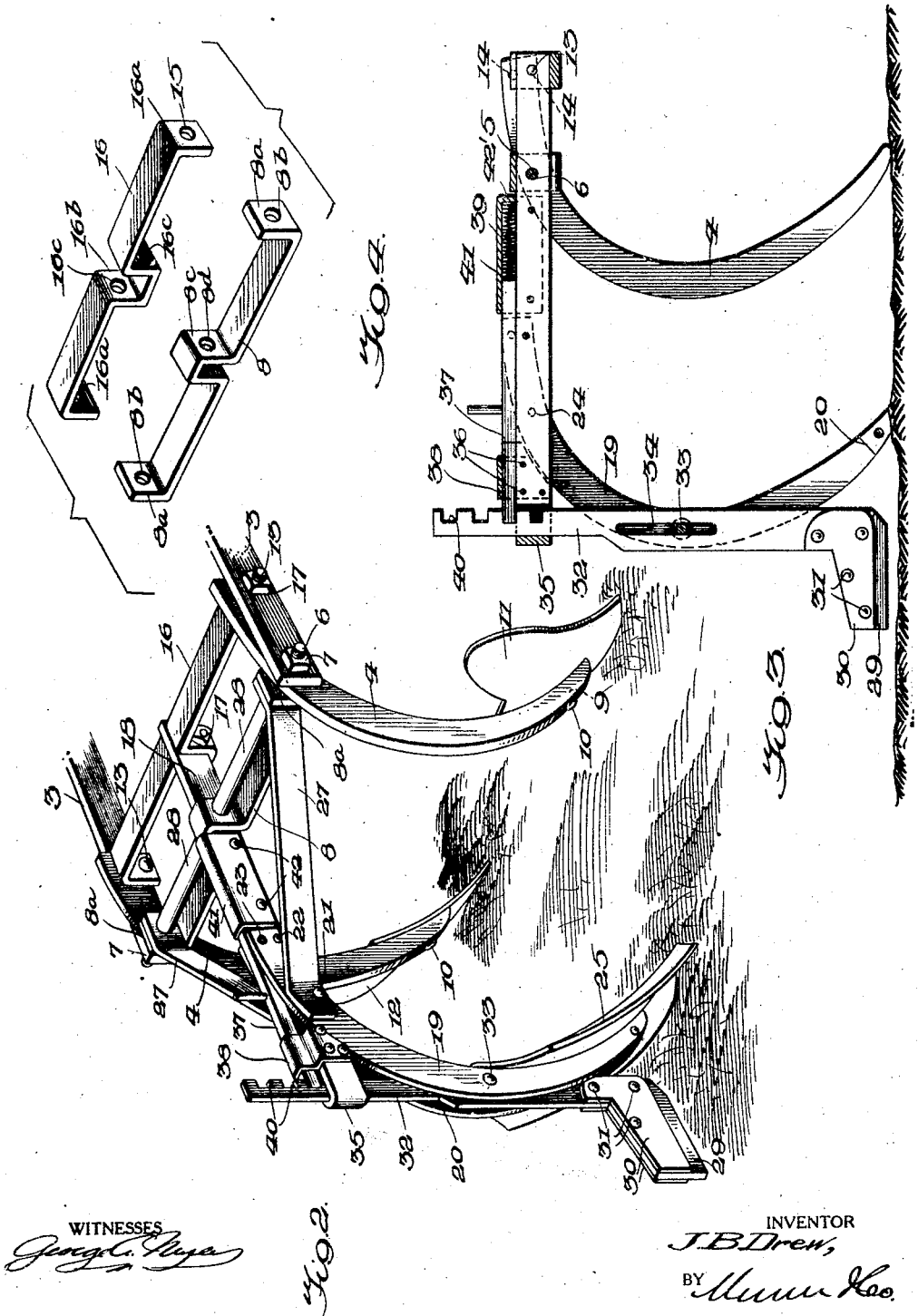
WITNESSES
INVENTOR
J. B. Drew,
BY
ATTORNEYS Patented June 15, 1926.

1,588,400

UNITED STATES PATENT OFFICE.

JESSE BAREFIELD DREW, OF HOLLANDALE, MISSISSIPPI.

COMBINATION MIDDLEBREAKER AND CULTIVATOR ATTACHMENT FOR PLANTERS OR FERTILIZER DISTRIBUTORS.

Application filed March 10, 1925. Serial No. 14,508.

My invention is an improvement in attachments for planters or fertilizer distributors, and it consists in the combinations, constructions and arrangements herein described and claimed.

It is customary for farmers in certain sections of the country to plant peas between adjacent rows of corn. It also is customary to fertilize the land by dropping fertilizer between rows of corn, cotton or the like. The planting of peas between rows of corn ordinarily is effected by means of a corn planter having a pea planting attachment or plate for distributing the peas on top of a small ridge which has previously been left in the middle of the space between adjacent rows. The work of planting the peas in such ridge ordinarily requires the use of a pea planter as just described, and the labor of one man and a draft animal for the pea planter. After the peas have been planted, the ridge or middle portion of the space between adjacent rows is plowed out to scatter the peas and to distribute them at the sides of the row and at the same time to cover them. This work also requires the labor of one man, a draft animal, and some sort of plow. Fertilizer is planted and distributed between rows in substantially the same manner as the peas and requires the labor of the same number of men and draft animals and the use of equipment similar to that just mentioned for the planting and distributing of peas between adjacent rows.

An object of the present invention is to effect an economy in the time, labor and equipment required to plant and distribute peas, fertilizer or the like between adjacent rows.

A more specific object of the invention is the provision of an attachment for an ordinary planter or fertilizer distributor, such as any one of a plurality of well known corn and cotton planters and fertilizer distributors, which will be effective to carry out and attain the aforesaid object of the invention.

A still further object of the invention is the provision of an attachment of the character described which can be attached to and removed from the side bars of an ordinary planter without the use of any special tools and which affords facilities for supporting blades for breaking the soil at the inner sides of adjacent rows and an additional blade for breaking and distributing the soil midway between the adjacent rows, the respective blades being adjustable vertically separately and collectively.

Other objects and advantages of the invention will be apparent from the following description, considered in conjunction with the accompanying drawings, in which:

Figure 1 is a side elevation of a corn or cotton planter and fertilizer distributor equipped with a middlebreaker and cultivator attachment embodying the invention, Figure 2 is a perspective view of the complete attachment fastened to the rearward end portion of the usual side bars or beams of the planter exhibited in Figure 1.

Figure 3 is a longitudinal vertical section through the structure exhibited in Figure 2, and Figure 4 is a perspective group view of the two cross bars which are comprised in the attachment.

In Figure 1, the numeral 1 generally designates a corn and cotton planter and fertilizer distributor of a well known type of construction. The planter and fertilizer distributor has a frame movably supported at its forward end on a ground wheel 2, the frame including a pair of rearwardly divergent side beams 3. The frame of the planter and fertilizer distributor of course supports the usual means for holding and dropping grains of seeds and fertilizer. The parts described so far form no part of the invention except in so far as they cooperate with the parts which will now be described. The usual planter and fertilizer distributor also includes a ground wheel or like supporting means at the rear of the frame, together with means at the rearward end of the frame for covering the dropped seed and fertilizer. Such rear supporting and covering means are not shown in the drawings, but are replaced by the attachment which is attached to the rearward end portions of the side beams 3.

The attachment comprises a pair of side blade supporting standards 4, each of which is curved longitudinally substantially along an arc of a circle as shown. Each standard 4 is provided with a transverse opening 5 adjacent to, but spaced from its upper end for the reception of a connecting cross rod 6 which extends through the openings 5 of the two standards 4 and through alined transverse openings in the rearward end portions of the side beams 3. Nuts 7 are screwed on the outer ends of the rod 6 against the outer faces of the side beams 3. The respective side blade supporting standards 4 are swingable on the cross rod 6 and are held against the inner faces of the side beams 3 of a rear cross bar 8. The rear cross bar 8 is best seen in Figure 4 and has upturned end portions $8^a$ provided with alined openings $8^b$ and also is bent upwardly substantially into inverted U-shape intermediate its length as indicated at $8^c$, the side members of the portion $8^c$ having alined openings as at $8^d$ which also are in alinement with the openings $8^b$. The cross rod 6 extends through the openings $8^b$—$8^d$—$8^b$ so that the cross bar 8 will be supported on the cross rod 6 and the upturned end portions $8^a$ will be in contact with the inner faces of the standards 4 and will hold said standards against the inner faces of the side beams 3. The standards 4 are arranged on the cross rod 6 with the concavely curved faces thereof at the front, and each standard 4 is provided with an opening 9 adjacent to its lower end for the reception of a bolt 10 for securing a side cultivating blade 11 or 12 on the lower end portion of the standards 4 at the front thereof, the blade 11 being secured to one of the standards 4 and the blade 12 being secured to the other standard 4.

The standards 4 are held against swinging about the axis of the cross rod 6 from any one of a plurality of adjusted positions by means of bolts 13 each of which extends through a transverse opening in a side beam 3, through one of a plurality of vertically spaced transverse openings 14 in the extreme upper end portion of the adjacent standard 4 and through an opening 15 in the adjacent downturned end portion $16^a$ of a front cross bar 16, the bolts 13 having the free end portions thereof engaged by nuts 17. The standards 4 thus may be releasably held in any one of a plurality of adjusted positions about the axis of the cross rod 6 and the distance of the lower ends of the blades on the standards 4 to the side beams 3 can be varied within limits. In the embodiment of the invention shown, each of the standards 4 is provided with only two of the openings 14, but it is obvious that a greater number of such openings can be provided, if desired.

The front cross bar 16 has the intermediate portion thereof bent downwardly substantially into U-shape, as indicated at $16^b$, the side members of the U-shaped portion $16^b$ having alined openings $16^c$ for the reception of a bolt 17 which extends through a transverse opening in the forward end portion of a center beam 18 which is disposed between the arms of the portion $16^b$ and also extends between the arms of the portion $8^c$ of the rear cross bar and is connected with the latter by means of the cross rod 6 which extends through an opening in the center beam. The center beam 18 thus is supported midway between the side beams 3 and extends rearwardly beyond the rearward ends of the side beams. This center beam 18 carries a third blade supporting standard indicated at 19. The standard 19 is curved to have the same general shape as the side blade supporting standards 4, but is slotted longitudinally from its upper end nearly to its lower end as indicated at 20. The center beam 18 is received in the upper end portion of the slot 20 and the standard 19 is pivotally attached to the center beam 18 by a transverse pivot bolt 21. The pivot bolt 21 extends through the standard 19 at a slight distance from the upper end of the latter, and through the center beam 18 at a slight distance from its rearward end. The standard 19 is held against swinging about the axis of the pivot bolt 21 from any one of a plurality of adjusted positions by a bolt 22 which extends through any selected pair of alined transverse openings 23 in the furcations of the slotted standard 19 and through a transverse opening 24 in the center beam 18, there being a plurality of vertically spaced openings 23 in each furcation of the slotted beam 19. The distance from the lower end of a breaker and distributor blade 25 which is secured on the lower end portion of the standard 19 by a bolt 26, to the center beam 18 thus may be varied within limits by engaging the bolt 22 with openings 23 at different levels on the upper end portions of the furcations of the slotted standard 19.

The standards 19 and the rear end portion of the center beam 18 are stayed to the rear cross bar 8 and to the cross rod 6 by brace bars 27, each of which has an opening adjacent to its forward end through which the cross rod extends and has an opening adjacent to its rearward end through which the bolt 21 extends, the respective brace bars 27 converging toward opposite sides of the standard 19 from their connections with the cross bar 6 and being held on the cross bar 6 against the inner faces of the upturned end portions $8^a$ at opposite ends of the cross bar 8 by spacing and housing sleeves 28 which surround the portions of the cross bar 6 between the upturned end portion $8^a$ and the inverted U-shaped middle portion 8° of the cross bar 8. A well braced and stable construction thus is provided for supporting the side standards 4 and the middle standard 19 which is disposed rearwardly of the side standards 4 and at approximately the same distance from each of the standards 4.

The attachment also comprises means whereby the standards 4 and 19 and the hereinbefore described means by which the standards are supported can be adjusted vertically within limits with respect to the surface of the earth for any purpose, as for example to permit removal or replacement of the blades on the standards or to vary the depth which the blades will penetrate in the soil. Such adjusting means comprises a slide foot 29 which is secured by a pair of clamping plates 30 and fastening devices 31 to the lower end portion of a slide foot supporting standard 32. The latter extends vertically between the furcations of the slotted standard 19 and is held against moving rearward or forward with respect to the standard 19 by a guide bolt or pin 33 which extends between the furcations of the standard 19 through a vertical guide slot 34 in the slide foot supporting standard 32. The standard 32 is retained against swinging about the axis of the guide bolt 33 by a guide strap 35 which is shown as being substantially U-shaped and as having arm straddling the rearward end portion of the center beam 18 and being secured to the latter by transverse fastening elements 36 so that a space is provided between the web of the guide 35 and the rearward end of the center beam through which the upper end portion of the standard 32 may be slid. The standard 32 is held in vertically adjusted position with respect to the center beam 18 by a latch bolt 37 which slides on the upper side of the center standard through a latch bolt guide 38 which is secured to the center beam 18 by the fastening devices 36, the latch bolt 37 being urged axially rearward by an actuating spring 39 to position to engage with any one of a plurality of vertically spaced notches 40 in the front edge of the standard 32. The spring 39 is housed in a substantially U-shaped member 41 having arms straddling the center beam 18 and secured to the latter by bolts 42, the web portion of the spring housing 41 being spaced from the upper edge of the center beam 18 for the reception of the spring 39 and also for the reception of the rearward end portion of the latch bolt 37, the web of the housing member 41 having a pendent stop projection 42 at its forward end against which the forward end of the spring 39 reacts.

From the foregoing description of the various parts of the device, the operation thereof may be readily understood. The peas, other seed or fertilizer may be dropped between adjacent rows by the usual means provided therefor as a part of the planter 1. The blade 25 is of the shovel type, being angular in cross section, the sides of the blade diverging rearwardly from the vertical median line of the blade so that the blade 25 is adapted not only to cut into the soil but to deflect the loose surface soil rearwardly and outwardly. The side blades 11 and 12 extend laterally outward from the side standards 4 and are curved and otherwise fashioned to not only cut into the soil but to deflect loose soil outwardly from the standards or in other words, toward the rows between which the attachment is drawn.

The soil containing the peas, fertilizer or the like therefore will be well broken up and distributed throughout the space between the rows at the same time such peas or fertilizer are dropped between the rows. A considerable economy in the time and labor and equipment required for the planting of the peas or the application and distribution of fertilizer between adjacent rows therefore will be effected when the improved attachment is applied to a planter in the manner described in the foregoing.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. An attachment for a planter having a pair of spaced side beams, said attachment comprising a pair of side blades, and a third blade, a standard for each of said blades, a cross rod adapted to be secured to said spaced side beams of the planter, the standards for said first named blades having openings through which said cross rod extends, means connecting the standards for said first named blades to said side beams to prevent swinging of said standards about the axis of said cross rod, a center beam having an opening through which said cross rod extends, means holding said center beam horizontal midway between the side beams of the planter, means connecting the standard for said third blade to said center beam, and adjustable means for raising and lowering said center beam and the parts associated therewith.

2. An attachment for a planter having a pair of spaced side beams, said attachment comprising a pair of side blades, and a third blade, a standard for each of said blades, a cross rod adapted to be secured to said spaced side beams of the planter, the standards for said first named blades having openings through which said cross rod extends, means connecting the standards for said first named blades to said side beams to prevent swinging of said standards about the axis of said cross rod, a center beam having an opening through which said cross rod extends, means holding said center beam horizontal midway between the side beams of the planter, a slide member, a standard secured at its lower end to said slide member, means connecting said slide member supporting standard and the standard for said third blade so that said slide member supporting standard has limited vertical movement in respect to said center beam, and means for locking said slide member supporting standard to said center beam.

3. An attachment for a planter having a pair of side beams, said attachment comprising a center beam, means connecting said center beam with said side beams for holding said center beam rigid with the side beams midway between the side beams, a pair of side blades, standards connecting said side blades adjustably with said side beams, a third blade, and a standard connecting said third blade to the rearward end portion of said center beam, a slide foot, a standard attached at its lower end to said slide foot, said slide foot supporting standard and the standard for said third blade having co-engaging elements for connecting said slide foot supporting standard to the standard for said third blade so that said slide foot supporting standard can move vertically, and means for locking said slide foot supporting standard to said center beam.

4. An attachment for a planter having a pair of side beams, said attachment comprising a center beam, means connecting said center beam with said side beams for holding said center beam rigid with the side beams midway between the side beams, a pair of side blades, standards connecting said side blades adjustably with said side beams, a third blade, and a standard connecting said third blade to the rearward end portion of said center beam, a slide foot, a standard attached at its lower end to said slide foot, said slide foot supporting standard and the standard for said third beam having co-engaging elements for connecting said slide foot supporting standard to the standard for said third blade so that said slide foot supporting standard can move vertically, said slide foot supporting standard having a series of vertically spaced notches, a slide foot standard guiding and retaining member carried by said center beam, and a lock bolt slidable on said center beam for engaging with the notches in said slide foot supporting standard.

5. An attachment for a planter having a pair of side beams, said attachment comprising a pair of side standards, a front cross bar having a downwardly turned U-shaped intermediate portion and having downwardly turned end portions, fastening devices securing the down turned end portions of said cross bar to the upper ends of said side standards and to the side beams of the planter, a second cross bar having the middle portion thereof bent upwardly into substantially inverted U-shape, and having the end portions thereof also turned upwardly, a cross rod extending through the upturned inverted U-shaped middle portion of the rear cross bar through the upturned end portions of the rear cross bar, through said side standards, and through said side beams of the planter, a center beam extending between the arms of the inverted U-shaped portion of said rear cross bar and also between the arms of the U-shaped portion of said front cross bar and being secured to said cross bars, a middle standard slotted longitudinally from its upper end for the reception of said center beam, and means securing said middle standard to the center beam.

6. An attachment for a planter having a pair of side beams, said attachment comprising a pair of side standards, a front cross bar having a downwardly turned U-shaped intermediate portion and having downwardly turned end portions, fastening devices securing the downturned end portions of said cross bar to the upper ends of said side standards and to the side beams of the planter, a second cross bar having the middle portion thereof bent upwardly into substantially inverted U-shape, and having the end portions thereof also turned upwardly, a cross rod extending through the upturned inverted U-shaped middle portion of the rear cross bar, through the upturned end portions of the rear cross bar, through said side standards, and through said side beams of the planter, a center beam extending between the arms of the inverted U-shaped portion of said rear cross bar and also between the arms of the U-shaped portion of said front cross bar and being secured to said cross bars, a middle standard slotted longitudinally from its upper end for the reception of said center beam, means adjustably securing said middle standard to the center beam, and other means fastening said side standards and said side beams to hold said side standards against turning about the axis of said cross rod.

7. An attachment for planters having a pair of side beams, said attachment comprising a center beam, means connecting said center beam with said side beams so that said center beam is disposed midway between said side beams and is rigid with the side beams, a standard secured at its upper end to the outer end portion of said center beam, said standard being slotted longitudinally and being adapted to support a blade at its lower end, a slide foot, a slide foot supporting standard extending for part of its length in the slot of said first standard, said slide foot supporting standard having a slot extending longitudinally therein, a bolt carried by said first named standard working in the slot of the second standard for limiting the vertical movement of the latter in respect to the first standard, a guide for said second named standard at the rearward end of said center beam, said second named standard having a vertical series of notches in the side thereof next to the rearward end of said center beam, and a spring pressed lock bolt slidable on said center beam to and from position to engage with the notches of said slide foot supporting standard.

JESSE BAREFIELD DREW.